Feb. 21, 1961
M. E. CHANDLER ET AL
2,972,229
JET ENGINE FUEL CONTROL
Filed Jan. 11, 1950
2 Sheets-Sheet 1
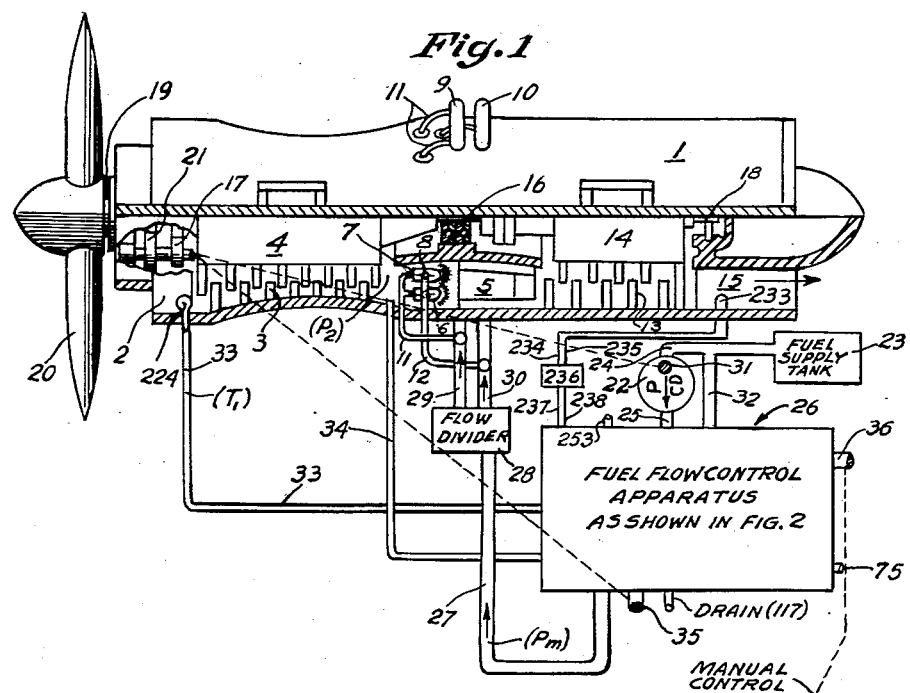
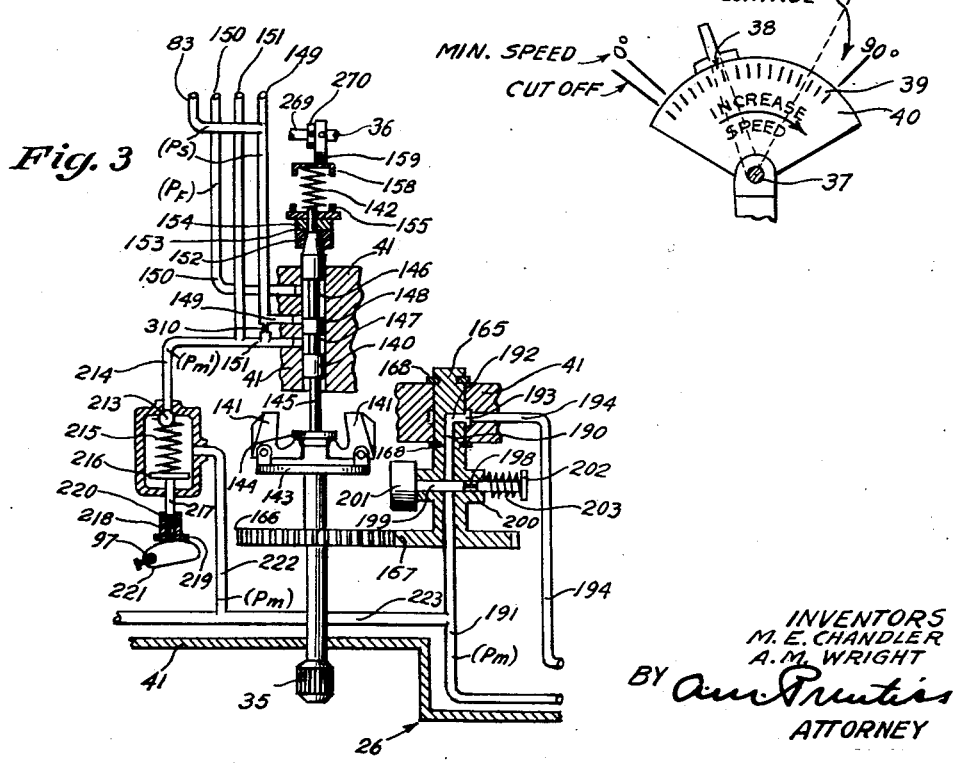
INVENTORS
M. E. CHANDLER
A. M. WRIGHT
BY
ATTORNEY

United States Patent Office 2,972,229
Patented Feb. 21, 1961

2,972,229
JET ENGINE FUEL CONTROL

Milton E. Chandler, New Britain, and Alexander M. Wright, West Hartford, Conn., assignors, by mesne assignments, to Chandler-Evans Corporation, West Hartford, Conn., a corporation of Delaware Filed Jan. 11, 1950, Ser. No. 138,056

13 Claims. (Cl. 60—39.28)

This invention pertains to automatic fuel and speed control apparatus for internal combustion engines and more particularly has reference to fuel and speed controls for aircraft continuous combustion engines of the gas turbine and jet types.

The invention is especially applicable to continuous combustion engines for propeller-propulsion, jet-propulsion (turbo-jet), or propeller-and-jet (prop-jet) propulsion of aircraft. Such engines usually include an air inlet, an air compressor, one or more combustion chambers, a gas turbine, and a tail pipe for discharging combustion gases to the atmosphere. Associated with these engines is a fuel system including a pump for delivering fuel to the combustion chambers. This invention concerns apparatus to control the engine speed and power by regulating the fuel supply as a function of a manual control and several variables, including atmospheric density, engine speed, engine temperature, and other engine operating conditions.

Owing to structural and metallurgical limitations, engines of the type referred to cannot be safely operated at speeds and temperatures exceeding predetermined limiting values, but for maximum economy of operation, both engine speed and temperature must be maintained at or near these limiting values. On the other hand, while engine speed is a critical factor in flight performance of aircraft, an engine cannot be operated at maximum speed in all flight maneuvers, at all flight speeds, or under all flight conditions. Fuel control apparatus should, therefore, enable the operator to vary engine speed and power as desired from a required minimum to the predetermined limit of speed and full power. The control of engine temperature is preferably an automatic function of the fuel control apparatus, during transient and maximum speed conditions.

The value of engine speed corresponding to any given value of fuel flow, varies as a function of the speed of flight, air density at the engine air inlet, engine torque, fuel quality, and a wide variety of other factors. Therefore, for precise regulation of engine speed, or to avoid excessive engine temperatures, it is not feasible to rely solely upon automatic regulation of fuel flow as a function of variables which exclude engine speed and temperature.

As one solution of the problem, it has been proposed to control engine performance by regulating the fuel supply to the engine by means of a regulator, consisting of a self-contained unit running on its own fluid, which produces an hydraulic pressure that is transmitted to a variable delivery fuel pump so designed that its delivery varies in a desired relationship to said pressure. Such a control apparatus was disclosed in the application of Leighton Lee II, for Control Apparatus, Serial No. 746,975, filed May 9, 1947, now Patent No. 2,675,674, and assigned to the same assignee as this application. Recent experience in operating aircraft under conditions of very low temperatures has shown that better performance can be obtained if the fuel control works directly on the fuel supply to the engine, rather than on the fuel pump.

Accordingly, the new type of fuel control herein disclosed is devised to function directly on the fuel supply to the engine and is not only capable of performing the functions of the apparatus disclosed in the Lee application, cited, but also has some advantages not offered by that apparatus.

Heretofore, the unemployment of fuel control devices of the types mentioned have necessitated the use of an emergency control apparatus to take over the control of the fuel supply to the engine in the event of failure of the normal fuel control system. This has the disadvantage of requiring two separate fuel control apparatuses with special devices to permit shifting from the normal to the emergency control, all of which involves added complication and expense in original installation and maintenance. A further disadvantage in the fuel control systems heretofore employed is that the failure of any vital part of the control system may cause a failure of the engine, with consequent liability of destruction of the aircraft and loss of life to the crew. In order to overcome these disadvantages, the fuel control system herein disclosed combines in one apparatus, both normal and emergency fuel control systems. This not only greatly simplifies the overall fuel control system, but results in a material saving in cost, weight and space required for installation, since all of the control apparatus, for both normal and emergency operation, is within a single self-contained package. In addition, the fuel control system herein disclosed incorporates several novel "fail-safe" features whereby, in the event of failure of one or more vital parts of the fuel control apparatus, there is no failure of the fuel supply to the engine and consequently no engine failure.

The objects of this invention are to provide:

Improved fuel and speed control apparatus comprising, in a single self-contained package, a plurality of component coordinated hydraulic systems for regulating fuel delivery to the engine, under both normal and emergency fuel control operating conditions; said systems being responsive to a single manual control and to pressure, speed and temperature conditions of the engine.

An improved fuel control system, wherein the fuel regulating apparatus operates in its own fluid (fuel) and acts directly on the fuel supplied to the engine by a constant delivery pump and regulates its flow by means of a suitably controlled by-pass valve.

An improved fuel control apparatus which produces a substantially constant engine speed, corresponding to the selected position of a single manual control lever, under all engine and normal fuel control operating conditions.

In such apparatus, improved pressure-responsive fuel flow regulating elements which are adapted for use in hydraulic systems, such as those mentioned above, and which, in the event of failure, "fail-safe," so as not to cause a failure of sufficient fuel flow to the engine to meet its operating requirements. These "fail-safe" features insure continuance of normal operation in the event of failure of critical control components, and also permit manual control of engine operation between idle and normal rated power.

A control which functions so that the engine can be accelerated and decelerated at a maximum rate, corresponding respectively to the maximum temperature permissible ahead of the turbine, and to the minimum fuel flow corresponding to burner blowout conditions. In addition, the fuel flow is never great enough to cause stalling of the compressor.

An improved control apparatus wherein (under normal operating conditions), the fuel flow to the engine is regulated by:

(1) a metering orifice whose area is varied in accordance with the discharge pressure of the engine air compressor; and (2) a metering head across said orifice which varies with the position of a manual control lever, and which:

(a) during engine acceleration, varies in accordance with the temperature of the air entering the engine compressor, and the temperature of the exhaust gases in the engine tail pipe;

(b) during steady state engine operation, is controlled by a centrifugal speed governor geared to the engine, whose action is modulated by a device that anticipates the action of said governor, and is modified in accordance with the temperature of the exhaust gases in the engine tail pipe; and (c) during engine deceleration, is controlled by said governor, whose action is modified by the discharge pressure of the engine compressor.

In a speed and fuel control apparatus, improved means for insuring that the engine will never exceed a maximum safe speed under any normal or emergency condition of operation.

A control apparatus having adjustments for selecting the maximum fuel flow available for acceleration and means for adjusting the speed governor, with the engine running, including both an idle speed and a maximum speed adjustment, each having a specified percentage range of the normal values at standard sea level conditions.

A control apparatus having a thermal control device which varies the fuel flow in accordance with variations in temperature of the ambient atmosphere to prevent compressor stall and hence engine failure at low atmospheric temperatures, i.e. temperature below zero degrees, centigrade.

A control apparatus having a thermal override device with the output modulated by an engine air pressure (e.g., absolute compressor discharge pressure), and so arranged that malfunction of the override simply makes it inoperative and does not cause engine power failure.

A control apparatus having means to provide, during idle engine speed, an increasing rate of fuel supply with increasing flight altitude, in order to insure engine operation at all flight altitudes.

A control apparatus having means to anticipate boost pressures which may vary between wide limits, so as to insure that its performance is not affected by changes in boost (main-fuel-pump-inlet) pressure.

A control apparatus capable of operating in conjunction with water injection equipment when used on the engine.

With these and other objects in view which may be incident to our improvements our invention consists in the combination and arrangement of elements hereinafter described and illustrated in the accompanying drawings, in which:

Figure 1 shows, somewhat diagrammatically, an engine suitable for propeller-and-jet propulsion of aircraft, together with its associated fuel flow apparatus, operating in conjunction with a constant displacement fuel pump and manual control lever, and the principal connections therebetween;

Figure 3 shows a modified form of speed governor which may be used in the apparatus shown in Figure 2.

Figure 2:
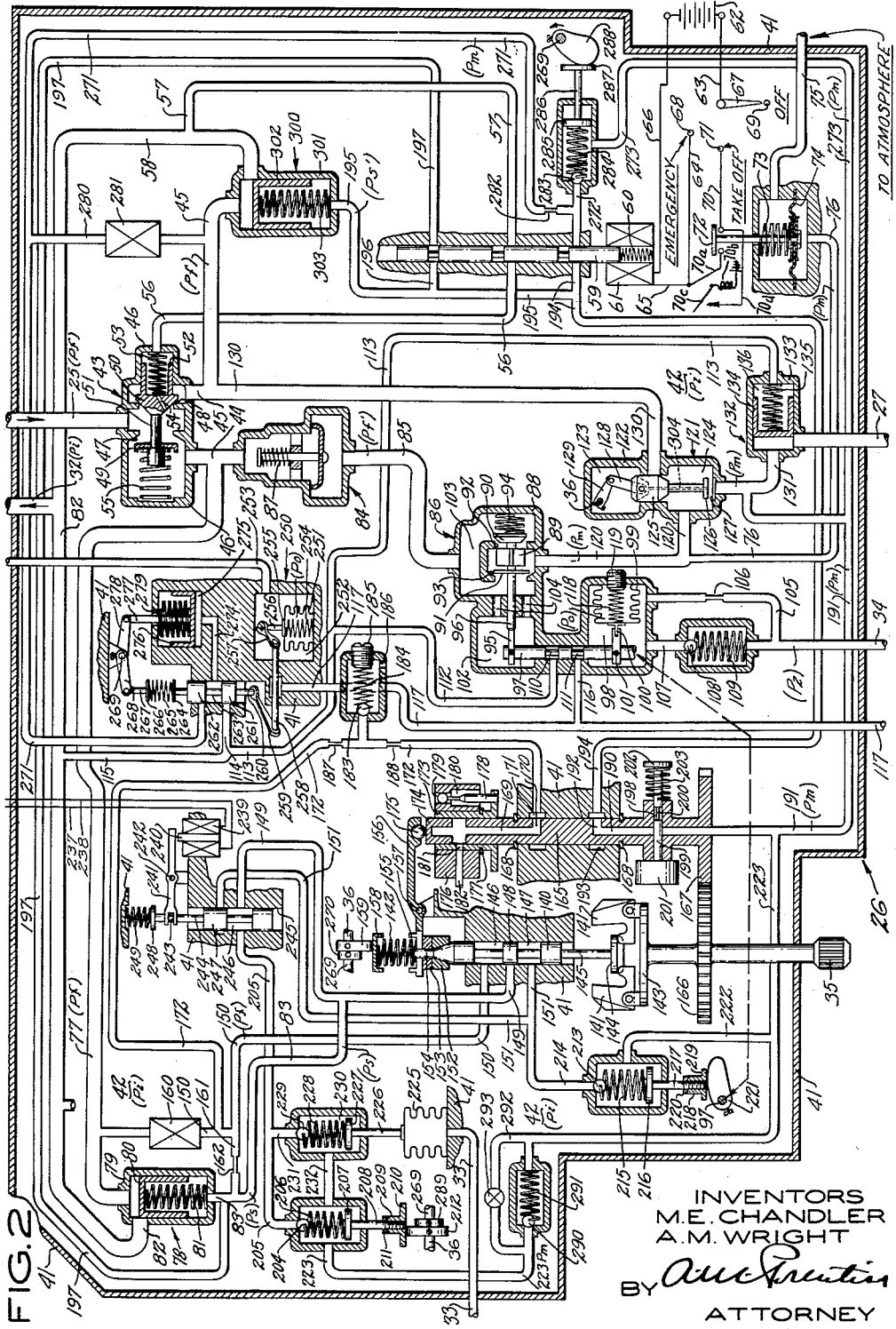
Figure 2 shows, also somewhat diagrammatically, a control apparatus embodying the principles of our invention.

Broadly comprehended, our invention comprises a normal and emergency fuel and speed control apparatus for a turbo-jet engine in which the normal and emergency control systems are combined in one self-contained package that regulates the delivery of fuel to the engine from a constant delivery fuel pump under all engine operating conditions. The normal and emergency fuel control systems are interconnected by a change-over valve that is normally in a position to admit fuel from the fuel pump to the normal fuel control system, and is adapted upon manual operation by the pilot to shut off the fuel supply to the normal control system and admit fuel to the emergency control system, and vice versa. The change-over valve is also arranged so that, during take-off of the aircraft from the ground, any failure of the fuel flow through the normal control system will cause the change-over valve to automatically shift its position so as to change the fuel flow from the normal to the emergency control system. In other words, the change-over from normal to emergency fuel flow regulation is under the manual control of the pilot at all times, except during take-off of the aircraft from the ground, when the change-over is automatic upon failure of the normal fuel control system.

In the normal control system, the fuel flow to the engine is regulated by:

(1) a metering orifice whose area is varied in accordance with the discharge pressure of the engine air compressor; and (2) a metering head across said orifice which varies with the position of a manual control lever, and which:

(a) during engine acceleration, varies in accordance with the temperature of the air entering the engine, compressor, and the temperature of the exhaust gases in the engine tail pipe; which (b) during steady state engine operation, is controlled by a centrifugal speed governor geared to the engine, whose action is modulated by a device that anticipates the action of said governor, and is modified in accordance with the temperature of the exhaust gases in the engine pipe; and which (c) during engine deceleration, is controlled by said governor, whose action is modified by the discharge pressure of the engine compressor.

In the emergency system, the fuel flow to the engine is regulated by the position of the manual control lever; and in both the normal and emergency systems, the fuel flow, during idle engine operation, is regulated so as to provide an increasing rate of fuel supply with increasing flight altitude, and the fuel flow is further limited by a top speed governor, so as to prevent engine speeds (r.p.m.'s) from exceeding a predetermined maximum safe limit.

Referring now to Figure 1 of the drawings, there are shown, as the principal elements of the engine above referred to: a supporting casing 1, an air inlet 2, a multistage air compressor 3, a compressor rotor shaft 4, one each of a number of combustion chambers 5; a series of combustion nozzles 6, each having a fixed slot 7 and an auxiliary slot 8, connected respectively to two generally circular fuel manifolds 9 and 10, by means of conduits 11 and 12, a multistage gas turbine 13, a turbine rotor shaft 14, connected to the compressor rotor shaft 4; a tail pipe 15 for discharging exhaust gases from gas turbine 13; a center bearing 16 and end bearings 17 and 18, supported by casing 1; a propeller shaft 19, carrying a propeller 20, and a gear train 21, connecting shafts 4 and 19 for rotating propeller 20 at a speed proportional to engine speed and for operating the fuel pump and other accessories. The construction of a turbo-jet engine used solely for jet propulsion is similar to that of the engine shown in Figure 1, except for the omission of the propeller shaft 19 and corresponding modification of the gear train 21.

A constant displacement fuel pump 22 draws fuel from a supply tank 23 through a conduit 24, which may include a boost pump (not shown), and delivers it through a conduit 25 to the fuel flow control apparatus diagrammatically indicated at 26 and shown in detail in Figure 2. From fuel control apparatus 26, the fuel flows through a conduit 27 to a pressure-responsive flow-divider 28, and from thence through conduits 29 and 30 to fuel manifolds 9 and 10, respectively, in the engine. Pump 22 is operated by a drive shaft 31 connected to gear train 21 in the engine, or to any other suitable source of power. The fuel control apparatus 26 acts to vary the quantity of fuel delivered to the engine per unit of time, as required by the operating conditions, and the difference between the fuel delivered by the pump 22 and the quantity required by the engine is by-passed through a relief valve in the fuel control apparatus 26 and return conduit 32 to the inlet side of the pump.

In each of the combustion nozzles 6 there is a series of fixed slots, one of which is indicated at 7, through which fuel enters the nozzles 6 from conduit 11. The fuel flow from the nozzles 6 is directly proportional to the effective area of slots 7 and is a square root function of the drop across the nozzles between the pressure in conduit 11, which is substantially equal to the pressure ($p_m$) in conduit 29, and the pressure ($p_2$) in the combustion chamber 5. As it is desired to limit the range of fuel pressures so that their value at maximum fuel flow is less than that corresponding to the square root function of the drop across slots 7, the nozzles 6 are provided with auxiliary slots 8 supplied by manifold 12 connected to the pressure-responsive flow-divider 28 which opens at a predetermined value of the pressure ($p_m$) in conduit 27. In this manner, the pressure ($p_m$) may be maintained sufficiently high to produce satisfactory nozzle discharge without requiring the fuel regulator 26 and pump 22 to operate under unfavorable pressure conditions at maximum flow.

The fuel flow control apparatus indicated as 26 in Figure 1, and shown diagrammatically in Figure 2, is connected by a conduit 33 to a source of compressor inlet temperature located in the engine air inlet 2, and by a conduit 34 to a source of compressor discharge pressure ($p_2$). As subsequently explained, the fuel control apparatus 26 is responsive to the air inlet (ambient atmospheric) temperature ($T_1$) and to the absolute compressor discharge pressure ($p_2-p_0$) which is a function of air flow through the engine. The value ($p_2-p_0$) increases as the engine speed increases and decreases as the altitude of flight decreases, and is also a function of the compressor characteristics.

A main drive shaft 35 in fuel control apparatus 26 is driven by the engine at a speed proportional to engine speed and a manual control shaft 36 is rotated in response to movement of a shaft 37 to which is fixed the engine control lever 38. Control lever 38 is manually operable in reference to a scale 39 on a fixed quadrant 40, the scale 39 being calibrated in terms of engine speed (r.p.m.).

Referring to Figure 2, there is shown, somewhat diagrammatically, an embodiment of our invention, indicated by the reference numeral 26 in Figure 1, all the elements of which (except switches 67, 70C and 72) are enclosed in a casing 41 which is connected by a conduit 34 to the compressor discharge chamber in the engine 1, for supplying air to the control apparatus at the compressor discharge pressure ($p_2$). The control apparatus shown in Figure 2 is a self-contained hydraulic system employing the interior of casing 41 as a reservoir 42 which is maintained approximately full of liquid fuel at the inlet pressure ($p_i$) of fuel pump 22 in order to permit the working elements to operate in a lubricating bath.

*Change-over valve system*

Referring first to Figure 1, liquid fuel is supplied from tank 23 through conduit 24 to fuel pump 22, at a pump inlet pressure ($p_i$), either under a gravity head as shown in Figure 1, or from a boost pump (not shown) between tank 23 and main fuel pump 22. As shown in Figure 2, fuel issuing from pump 22 flows through a conduit 25 to a double-acting, change-over valve 43 which has two outlet conduits 44 and 45 for respectively conducting fuel to the normal and emergency fuel flow regulating systems hereinafter described. Valve 43 comprises a hollow, cylindrical casing 46, closed at each end and having near its midportion two valve seats 47 and 48 which coact respectively with an adjustable head 49 and a fixed head 50 on valve member 51.

Integral with valve head 50 is a cylindrical sleeve 52 which is slidably mounted in the right end of casing 46 with a fluid-tight fit and surrounds a spring 53 that biases valve head 50 towards its seat 48. A small passageway 54 in head 50 affords restricted communication between the central chamber in casing 46 and the chamber formed by sleeve 52 and the right end of casing 46. When valve 51 is in its normal operating position, as shown in Figure 2, the fluid pressure between the two chambers just mentioned is equalized by passageway 54, and the force of spring 53 keeps valve head 50 on its seat 48 and cuts off fuel from inlet conduit 25 to outlet conduit 45. Valve head 49 is slidably mounted on valve stem 51 and is biased toward seat 47 by a light spring 55, so that when fixed head 50 moves to the right to its full open position, head 49 contacts its seat 47 in its fully closed position and cuts off all fuel flow from inlet 25 to outlet 44, and vice versa. The force of spring 55 is such that when valve 50 is in its closed position, as shown in Figure 2, the pressure of fuel in the central chamber of casing 46 is sufficient to keep valve 49 open, as indicated in Figure 2.

The chamber in the right end of casing 46 connects through conduits 56, 57 and 58 with fuel return conduit 32 when triple spool valve 59 moves down to its emergency operating position and establishes communication between conduits 56 and 57, whereupon fuel escapes from the chamber in the right end of casing 46 to pump inlet conduit 24 faster than fuel can enter said chamber through restriction 54. When this occurs, the fluid pressure differential acting to the right on valve head 50 overcomes the force of spring 53, and moves valve 51 to the right, which causes valve 49 to contact seat 47 and cut off fuel flow from inlet 25 to conduit 44 of the normal fuel regulating system. At the same time, the opening of valve 50 admits fuel from inlet 25 to conduit 45 of the emergency fuel regulating system. When triple valve 59 moves up to its normal operating position, cutting off communication between conduits 56 and 57, fuel can no longer escape from the right end of casing 46 and the fluid pressure therein quickly builds up through passageway 54 until it equals the pump discharge pressure ($p_t$) in the central chamber of casing 46, whereupon spring 53 moves valve 51 to the left until it returns to its normal operating position, as shown in Figure 2. Fuel is then admitted from inlet 25 to conduit 44 of the normal fuel regulating system and fuel flow is cut off from inlet 25 to conduit 45 of the emergency fuel regulating system.

Triple valve 59 is biased toward its upper (normal) operating position by a spring 60 and is retracted to its lower (emergency) operating position by a solenoid 61 which is energized by current flowing from a battery 62 through wires 63, 64, 65 and 66 when a switch 67 is in its upper (emergency) position in contact with terminal 68. Switch 67 is manually moved by the pilot to position 68 whenever he wishes to change over from normal to emergency fuel control operation. When the pilot desires to return to normal fuel control operation, he returns switch 67 to its lowest position 69. Solenoid 61 is also energized by current from battery 62 through wires 63, 70, 65, and 66 when switch 69 is moved to its intermediate (take-off) position 71 and switch 72 is in its lower (closed) position. Switch 72 is actuated by a spring 73 in opposition to a diaphragm 74 which is subject, on its upper side, to atmospheric pressure from conduit 75, and on its lower side, to metered fuel pressure from conduit 76 connected to the normal fuel regulating system, as shown in Figure 2. Switch 67 is always placed in intermediate (take-off) position 71 when the aircraft is taking off from the ground and the engine is operating under normal fuel control. Upon starting the engine, fuel pump 22 establishes, in the normal fuel regulating system, a pressure ($p_m$) which is transmitted through conduit 76 to the under side of diaphragm 74. This pressure overcomes the force of spring 73 (plus atmospheric pressure acting on the upper side of diaphragm 74) and moves switch 72 up to its open position where it remains as long as pressure ($p_m$) is sustained.

As long as switch 72 is in its open position, solenoid 61 is deenergized and valve 59 is in its upper (normal) operating position. If, during take-off, the normal fuel regulating system should fail for any reason, the fuel pressure ($p_m$) acting on the lower side of diaphragm 74 will fall, whereupon the greater force of spring 73 (plus atmospheric pressure on diaphragm 74) will close switch 72, energizing solenoid 61 and retracting valve 59 to its lower position, whereupon change-over valve 43 will automatically inactivate the normal fuel regulating system and activate the emergency fuel regulating system. When switch 67 is in intermediate (take-off) position and switch 72 is closed, current flows through a wire 70A and energizes a solenoid 70B which is grounded to the negative terminal of battery 62, whereupon solenoid switch 70C contacts the terminal of wire 70D, thus providing a shunt circuit around switch 72 through solenoid 61. If now a momentary rise in fuel pressure ($p_m$) in conduit 76 lifts switch 72 to open position, solenoid 61 will remain energized and continue the operation of the emergency control system until the pilot manually moves switch 67 to its lowest position 69. If no failure of the normal fuel regulating system occurs during take-off of the aircraft from the ground, the pilot moves switch 67 back to its lowest position 69 and normal fuel control operation continues. If, in subsequent flight, a failure of the normal fuel regulating system should occur, the pilot moves switch 67 to its upper emergency position 68, whereupon the fuel control is changed from the normal to the emergency system.

NORMAL FUEL REGULATING SYSTEM

The normal fuel regulating system of the control apparatus comprises ten mechanically and/or hydraulically operated cooperating control units as follows:

(1) A by-pass relief valve for regulating the pressure ($p_f$) of the liquid fuel in the conduit 25 on the downstream side of fuel pump 22.

(2) A main fuel metering valve which varies the flow of fuel to the flow-divider 28 and burner nozzles 6, as a function of the absolute compressor discharge pressure ($p_2-p_0$) of the compressor 3; the metering valve ports being contoured to give the necessary relation between fuel flow and compressor sensing pressure ($p_2-p_0$).

(3) A manual control whereby the pilot may vary the engine speed as desired throughout its permissible operating range and the speed is maintained at a substantially constant r.p.m., corresponding to the setting of the manual control lever 38, under normal fuel control and varying flight and engine operating conditions. The manual control includes a cut-off valve for completely stopping all fuel flow to the engine, when desired.

(4) A boost pressure compensating valve whereby the performance of the control apparatus is not affected by variations in boost (i.e., main-fuel-pump-inlet) pressure, even when such pressures vary between wide limits.

(5) An engine speed control comprising a spool valve, responsive to a main centrifugal speed governor driven by the engine, which varies the pressure equilibrium on the relief valve in (1) above and thereby varies the metering head on, and hence the rate of fuel flow through, the metering valve in (2) above. This variation in rate of fuel delivery will result in correction of the engine speed in any desired direction. The speed control system includes an inertia mechanism for immediately anticipating the action of the main speed governor in response to a change in manual control setting, whereby the "hunting" effect of the speed control is substantially eliminated and the engine made more quickly responsive to the manual control. The speed control system also has a topping speed governor which supplements the action of the main speed-governor and limits the speed of the engine to a permissible maximum (r.p.m.).

(6) A deceleration control which modifies the action of the speed governor in (5) above, so as to limit the rate of reduction of fuel flow when the manual control lever in (3) above is suddenly pulled back to decelerate the speed of the engine, in order to prevent too rapid reduction in fuel flow which may cause burner blowout.

(7) A thermal control which modifies the manual control in (3) above to vary the fuel metering head across the main metering valve in (2) above in accordance with variations in air inlet temperature ($T_1$), so that as the temperature ($T_1$) falls, the fuel metering head is correspondingly reduced, and vice versa, in order to counteract the tendency to excess fuel flow at low ambient atmospheric temperatures which may cause compressor stall.

(8) A thermal override control which overrides the manual control in (3) above, and regulates the fuel metering head when the engine (tail pipe) temperature ($T_4$) reaches a predetermined maximum safe limit. Normally, there is no liquid flow through the thermal override control until the maximum allowable tail pipe temperature is approached, whereupon liquid commences to flow through the thermal control which gradually lowers the governor servo pressure ($p_s$) on the by-pass relief valve and thus reduces the fuel pump discharge pressure ($p_f$). This reduction of fuel pump discharge pressure reduces the rate of fuel supply to the engine and results in reduced engine speed and temperature which again returns the thermal override control to normal (inoperative) position.

(9) An altitude control which modifies the action of the manual control in (3) above on the main speed governor in (5) above, as a function of altitude of flight, so as to provide an increasing rate of fuel flow to increase engine idling speeds with increasing altitude and thus prevent engine cut-out when idling at high altitudes.

(10) A water injection control which provides means for increasing the fuel flow to the engine during acceleration when water or other coolant fluid is used to prevent overheating of the compressor during engine acceleration.

Upon entering the normal fuel regulating system through conduit 44, fuel flows through a connecting conduit 77 to a main by-pass relief valve 78 which comprises a cylinder 79 having mounted therein a hollow piston 80, biased toward the upper end of the cylinder by a spring 81, so as to vary the opening of an outlet conduit 82 by which fuel in excess of engine requirements is returned through conduit 32 to the inlet side of fuel pump 22. The lower end of cylinder 79 is connected through a conduit 83 to other units of the normal fuel regulating system by means of which fuel under a control pressure ($p_s$) acts on the lower side of piston 80 in opposition to the fuel pump discharge pressure ($p_f$) in conduit 77 acting on the upper side of said piston. The force of spring 81 balances the pressure differential ($p_f-p_s$) and the spring rate is such that piston 80 maintains a predetermined value of the fuel pump discharge pressure ($p_f$) for each value of the control pressure ($p_s$) by varying the flow of fuel through return conduits 82 and 32.

Fuel entering the normal fuel regulating system through conduit 44 also flows through a check valve 84 and conduit 85 to a main fuel metering valve 86. In passing through check valve 84, the fuel pressure drops from fuel pump discharge pressure ($p_f$) to main metering valve inlet pressure ($p_{f'}$); the pressure differential ($p_f-p_{f'}$) being determined by the rate of a spring 87 in the check valve. The purpose of check valve 84 is to prevent any reverse flow through main metering valve 86, when the emergency control system is in operation.

Main metering valve 86 comprises a casing 88 in which is mounted a balanced valve 89 having two valve heads 90 and 91 which coact with equally spaced seats 92 and 93. A spring 94 biases valve 89 towards its seats 92 and 93 in opposition to a cam 95 which bears against the end of a stem 96 on valve 89. Cam 95 is adjustably attached to a shaft 97 which is journalled in casing 88 and extends through a chamber 98 in the opposite end of which is seated an air pressure bellows 99. The movable end of bellows 99 is connected by a link 100 to a crank arm 101 which is adjustably attached to shaft 97, whereby expansion and contraction of bellows 99 oscillates said shaft and reciprocates valve 89 through the medium of cam 95 and stem 96.

The chamber 102 in which cam 95 is housed is connected to metering valve chamber 103 by passages 104 so that fuel fills chamber 102 and acts as a lubricant for cam 95, stem 96 and shaft 97. Chamber 98 is connected by conduits 105 and 34 to compressor discharge chamber in the engine (Figure 1), and is supplied with air under compressor discharge pressure ($p_2$) through a restriction 106 in conduit 105. Chamber 98 is also connected through a conduit 107 and check valve 108 with conduit 34, whereby, upon a decrease in pressure ($p_2$) in conduit 34, the rate of decrease of air pressure in said chamber 98 is determined by the rate of a spring 109 which biases check valve 108 to its closed position. Shaft 97 has two undercut notches 110 and 111, through the first of which any fuel escaping from chamber 102 along shaft 97 flows into a return conduit 112 and thence through connecting conduits 113, 114, 115, 82 and 32 to the inlet side of fuel pump 22. Similarly, any air escaping from chamber 98 along shaft 97 flows through notch 111 and conduit 116 to overboard drain conduit 117.

Bellows 99 is evacuated to zero pressure ($p_0$) and sealed, whereby the pressure differential ($p_2$—$p_0$) acting thereon represents the absolute compressor discharge pressure. Bellows 99 is reinforced by a spring 118 whose force is adjustable by means of a set screw 119, whereby a predetermined schedule is maintained between the absolute compressor discharge pressure ($p_2$—$p_0$) and the area of opening of main fuel metering valve 89. Spring 118 insures that, in the event of breakage of bellows 99, main metering valve 89 will remain open (fail-safe).

From main metering valve 86, fuel flows under metered fuel pressure ($p_m$) through a conduit 120 to a manual control valve 121 which comprises a casing 122 divided into two chambers 123 and 124 by a manual fuel metering valve 125 slidably mounted in a central bore of casing 122. Integral with metering valve 125 is a fuel cut-off valve 126 in the form of a disk which is adapted to seat, with a fluid-tight fit, in a recess 127 in the lower end of casing 122 when valve 125 is in its lowest operating position. Valves 125 and 126 are made integral and are connected by a link 128 and crank arm 129 to manual control shaft 36. Crank arm 129 is adjustably attached to shaft 36 so that the travel of valves 125 and 126 may be suitably correlated with the angular oscillation of shaft 36, and valve 125 is contoured so as to vary, in a predetermined manner, the opening of a conduit 130 which connects manual metering valve 121 with conduit 45 of the emergency fuel regulating system, as will be further described hereinafter. The spacing of valves 125 and 126 is such that valve 126 lifts clear of its seat to full open position before valve 125 commences to open the port from conduit 130, thereby insuring that the flow of fuel through valve 125 is not affected by valve 126, whose sole purpose is to cut off all fuel flow to the engine when manual control lever 38 (Figure 1) is in its cut-off position.

From main fuel metering valve 121, the fuel flows under metered fuel pressure ($p_m$) through a conduit 131 to a boost pressure compensating valve 132 which comprises a casing 133 having slidably mounted therein a hollow piston valve 134 biased towards its closed position by a spring 135. The chamber 136 defined by casing 133 and piston 134 is connected by conduits 113, 114, 115, 82 and 32 to the inlet side of fuel pump 22, so that boost (fuel-pump-inlet) pressure ($p_i$) is maintained in chamber 136 and acts on piston 134 in opposition to metered fuel pressure ($p_m$) acting on the other face of said piston. The force of spring 135 balances the pressure differential ($p_m$—$p_i$) acting to the right on piston 134, and the spring rate is such that said piston varies the opening of fuel delivery conduit 27 in a predetermined inverse relation with fluctuations in pressure differential ($p_m$—$p_i$), due to fluctuations in boost pressure ($p_i$). Thus, if an extraneous rise in boost pressure ($p_i$) should occur, valve 134 would move to the left and correspondingly reduce the opening into conduit 27, so that the same rate of fuel flow through conduit 27 would obtain as before, and vice versa. The purpose of valve 132 is to prevent variations in fuel flow to the engine which would otherwise be caused by extraneous fluctuations in boost pressure ($p_i$).

Thus far, we have described the flow of fuel through the normal regulating system as subject only to regulation in accordance with absolute compressor discharge pressure ($p_2$—$p_0$) and to manual cut-off by valve 126. The regulation of normal fuel flow in accordance with engine speed, which is a function of the speed control units, will now be described. These units comprise: (1) a main speed governor for regulating engine speed during steady state operation; (2) an anticipator for stabilizing the action of said governor; (3) a topping speed governor to insure that the speed of the engine never exceeds a predetermined safe maximum (r.p.m.); (4) an acceleration control, for varying the fuel flow during engine acceleration in accordance with the temperature of the air entering the engine compressor, and for limiting the fuel flow in accordance with the temperature of the exhaust gases in the engine tail pipe, so as to prevent excessive engine (tail pipe) temperatures; and (5) a deceleration control for limiting the rate of decrease in fuel flow upon deceleration of the engine in accordance with absolute compressor discharge pressure, to insure against possible burner blowout.

The main speed governor comprises a spool valve 140 which is continuously rotated by the engine through the medium of main drive shaft 35, and is axially adjustable by a pair of centrifugal weight arms 141 acting on said valve in opposition to a variable force spring 142. Weight arms 141 are pivoted to a cross bar 143 attached to the upper end of drive shaft 35 and the inner end of each arm 141 engages in a notch in the lower face of a disk 144 which is integral with a stem 145 of valve 140. Upon rotation of arms 141 by shaft 35, the upper ends of said arms move radially away from stem 145, in proportion to their speed of rotation (i.e., engine r.p.m.), causing the lower ends of said arms to lift valve 140 against the force of spring 142 until the upward thrust of arms 141 is equal to the downward thrust of spring 142, whereupon the axial forces acting on valve 140 are in balance and said valve assumes its neutral position, as shown in Figure 2.

Valve 140 has two undercut portions 146 and 147 defining a middle land portion 148 which is of a width to just cover the end of a conduit 149 with about .002" overlap when valve 140 is in its middle or neutral position, as shown in Figure 2. When valve 140 is in such position, undercut portions 146 and 147 respectively uncover the ends of conduits 150 and 151; upon upward movement of valve 140, land 148 opens the end of conduit 149 and undercut 147 establishes communication between conduits 149 and 151; and upon downward movement of valve 140, undercut 146 similarly establishes communication between conduits 149 and 150. The upper end of valve 140 is tapered to form a seat for a conical thrust bearing 152 which is surmounted by a washer 153 that is held in alignment by a cylindrical stem 154 passing therethrough. Washer 154 bears against and supports an annular disk 155 which is integral with a lever 156, pivoted at 157 to casing 41. Spring 142 seats on disk 155 and supports an upper disk 158 which bears against a cam 159, adjustably attached to manual control shaft 36, so that spring 142 is compressed in a predetermined manner by the contour of said cam upon oscillation of shaft 36.

Conduit 150 includes a filter 160 and connects with conduit 77, so that fuel under pump discharge pressure ($p_f$) is conducted to undercut 146 of valve 140. A conduit 161 having a calibrated restriction 162 connects conduits 150 and 83 and fuel passing from the former to the latter undergoes a pressure drop from pump discharge pressure ($p_f$) to control pressure ($p_s$). A similar pressure drop occurs when fuel passes from conduit 150 past valve 148 to conduit 194, and the degree of opening of the end of conduit 149 by valve 148 determines the value of ($p_s$) in conduits 150 and 83 when valve 148 is below but near its mid (neutral) position, during steady state operation. In like manner, the value of ($p_s$) in conduits 149 and 83 is determined by the degree of opening of the end of conduit 149 by valve 148, when valve 148 is above but near its mid (neutral) position, during steady state operation.

Since the control pressure ($p_s$) in conduit 83 determines the value of the pump discharge pressure ($p_f$) in conduit 77, and hence the value of main metering valve 86 inlet pressure ($p_{f'}$), by the action of piston 80 in main by-pass relief valve 78, as described above, it follows that the pressure ($p_{f'}$) is regulated during steady state operation in accordance with engine speed by the action of the speed governor, in the manner just indicated.

In order to stabilize the action of the main speed governor and to render it more quickly responsive to changes in engine speed, we have provided an anticipator mechanism which comprises the following principal elements. A rotating valve member 165 is driven in fixed speed relation to valve 140 and weight arms 141 of the speed governor, through the medium of meshed gears 166 and 167. Valve member 165 is journalled in casing 41 and held in fixed axial relation thereto by locking rings 168. In the upper end of valve member 165 is a central passage 169 terminating at its lower end in a radial bore 170 that registers with an annular groove 171, connected by conduits 172, 150, 77 and 44 to change over valve 43, so that when valve 43 is in its normal operating position, fuel under pump discharge pressure ($p_f$) is supplied to bore 169. Fixedly attached to the upper end of valve member 165 is a sleeve 173, in the upper end of which is slidably mounted a hollow piston 174. The top of piston 174 bears against a ball bearing 175 carried in the right end of lever 156, so that when piston 174 rises in sleeve 173, in response to the fuel pressure ($p_f$) therein, it raises the right end of lever 156 which lowers the left end of said lever and therewith governor valve 140, and vice versa.

An annular inertia weight 176 is rotatably mounted on the outside of sleeve 173 and held in fixed axial relation thereto, by a locking ring 177. Weight 176 is flexibly connected to a flange on the lower end of sleeve 173 by a plurality of leaf springs 178, one of which is shown in Figure 2. Each spring 178 is fixedly attached at its lower end to sleeve 173 and is provided at its upper end with a ball head which contacts a bore 179 in the upper end of inertia weight 176. Below bore 179, is a larger bore 180 which is of sufficient diameter to permit spring 178 to bend under working load without contacting said bore. Sleeve 173 is provided with a port in the form of a generally rectangular slot 181, with its lower edge sloping upwardly, so that one end of the slot is of less width than the opposite end. Coacting with port 181 is a radial passageway 182 through inertia weight 176. The diameter of passageway 182 is equal to the difference in the width of slot 181 at its two ends, so that as inertia weight 176 rotates with reference to sleeve 173, slot 181 progressively varies the opening through passageway 182 from full open (as shown in Figure 2) to nearly closed, depending upon the direction of relative rotation of weight 176 with respect to sleeve 173. The outer end of passageway 182 opens into reservoir 42 in casing 41, so that as said passageway is opened by the movement of slot 181 across the inner end of said passageway, an increasing amount of fuel escapes from the space in sleeve 173 into reservoir 42, and vice versa. This variation in flow of fuel from sleeve 173 varies the liquid pressure on piston 174 and thus correspondingly varies the thrust of piston 174 on lever 156 and valve 140.

Connected to conduit 172 is a pressure regulating valve 183 which is biased toward its closed position by a spring 184 whose force is adjusted by a set screw 185. Fuel passing valve 183 escapes through port 186 into reservoir 42 in casing 41. Conduit 172 has a restriction 187 which reduces the rate of fuel flow through valve 183 and thus permits a very small movement of said valve to closely regulate the pressure in conduit 172 downstream from said restriction. A second restriction 188 in conduit 172, below the connection to valve 183, is accurately calibrated with reference to the variable opening through passageway 182 by slotted port 181. The area of restriction 188 is such that it exceeds the minimum, but is less than the maximum, opening through passageway 182 by slotted port 181. Thus, when the opening through passageway 182 is greater than the area of restriction 188, fuel escapes from sleeve 173 faster than it can flow thereinto, and the pressure therein falls, and vice versa. The adjustment of the force of spring 184 by set screw 185 determines the value of the pressure in conduit 172 between restrictions 187 and 188, and this pressure is held constant within close limits by the action of valve 183.

From the above description of our anticipator mechanism, it is apparent that the rotation of valve member 165 rotates inertia weight 176 by virtue of connecting springs 178 and so long as both valve 165 and weight 176 are rotating at the same steady speed (r.p.m.), there will be no angular displacement of weight 176 with respect to valve 165. Under this condition, the angular position of weight 176, with respect to sleeve 173, is such that the opening through passageway 182 by slotted port 181 is equal to the opening through restriction 188 and a steady hydraulic pressure, of a value determined by the setting of spring 184 in regulating valve 183, will be maintained in sleeve 173 by the uniform flow of fuel therethrough. If now there is an increase in engine speed, the speed of rotation of valve member 165 correspondingly increases, but owing to the inertia of weight 176 and its flexible connection to valve member 165 through springs 178, the speed of rotation of weight 176 will temporarily lag behind that of valve member 165, whereupon the movement of the opening at the inner end of passageway 182 across the slotted port 181 will increase the opening through said passageway thereby reducing the hydraulic pressure in sleeve 173. This decrease in pressure will cause a lowering of piston 174 and a proportional rise in valve 140, which effects a corresponding reduction in engine speed, as described above in the case of the main speed governor. Conversely, a decrease in engine speed causes a reverse operation of the anticipator mechanism which increases fuel flow to the engine with corresponding increase in engine speed.

Since gear 167 is smaller than gear 168, the anticipator valve member 165 is rotated at a proportionally higher speed which, together with the fact that the anticipator responds to acceleration, whereas the main speed governor responds to velocity of rotation, make the anticipator mechanism more sensitive and more quickly responsive to changes in engine speed than the main speed governor. Also, since the anticipator mechanism responds more quickly and accurately to changes in engine speed, it not only anticipates the action of the main speed governor, but also greatly increases the stability of the main speed governor and substantially eliminates "hunting" of said governor.

In connection with the action of the anticipator mechanism, we have found that leaf springs 178 give much better results than spiral springs, since the former, being relatively stiff in a radial direction across their width, are substantially unaffected by centrifugal force, whereas the latter are materially affected by centrifugal force with corresponding impairment of their function.

While the main speed governor (and anticipator mechanism) regulate engine speed, by suitably varying fuel flow to the engine in response to its speed, during steady state operation throughout its normal operating range, it has been found necessary to provide additional means for positively preventing the speed of the engine from exceeding a safe maximum (r.p.m.). This is the purpose and function of the topping speed governor which comprises the following elements. In the lower part of valve member 165 there is provided a central passageway 190, connected at its lower end through a conduit 191 with conduit 131, and terminating at its upper end in a radial bore 192 which registers with an annular groove 193 in casing 41. Groove 193 is connected by conduits 194, 195, 196 and 197 to conduit 83, by which fuel under control pressure ($p_s$) is supplied to passageway 190 when triple servo valve 59 is in its normal (upper) operating position and establishes communication between conduits 196 and 197, as shown in Figure 2. Valve member 165 is provided near its lower end with a horizontal bore 198 in which is slidably mounted a servo valve 199 having an undercut midportion 200, a cylindrical weight 201 attached to its left end, and a circular disk 202 attached to its right end. A spring 203, interposed between disk 202 and the right end of bore 198, biases valve 199 to the right (closed position). The diameter of valve 199 is such as to completely close passageway 190, except when said valve is moved to the left by the action of centrifugal force on weight 201, in opposition to the force of spring 203, whereupon the undercut portion 200 comes into register with passageway 190 and opens communication therethrough. The rate of spring 203 is such that servo valve 199 remains in its closed position until the speed of the engine reaches a predetermined safe maximum (r.p.m.), whereupon the centrifugal force acting on weight 201 overcomes the force of spring 203 and valve 199 moves to the right, thus quickly opening passageway 190. When this occurs, fuel escapes from conduit 83 through conduits 197, 196, 195, 194, 193, 192, 190, 191, 131 and 27 to the combustion chamber 5 of the engine, whereupon the ensuing reduction in control pressure ($p_s$) in conduit 83 causes piston 80 in relief valve 78 to descend and lower the pump discharge pressure ($p_f$) in conduit 77 and main metering valve inlet pressure ($p_{f'}$) in conduit 85, with consequent reduction in fuel flow to the engine and corresponding reduction in engine speed. If piston 80 should stick, a similar piston 302 in the emergency control system (described below) will function in a similar manner to regulate the pressure ($p_{f'}$). When the decreasing engine speed passes below the maximum safe limit, the decreased centrifugal force acting on weight 201 is less than the force of spring 203 so that valve 199 returns to its normal closed position, and the main speed governor takes over the regulation of engine speed.

It will be noted from the foregoing description that the operation of the topping speed governor is altogether separate and distinct from the operation of the main speed governor, so that if the main speed governor should fail with valve 148 in its lowest position, causing the engine to race, the topping governor would at once come into action and prevent the engine from exceeding its safe maximum speed.

From the construction of the main speed governor, as hereinabove described, it will be noted that the speed of the engine is under the manual control of the pilot by virtue of the action of cam 159 which is oscillated by manual control shaft 36 in response to a movement of manual control lever 38 (Figure 1). The contour of cam 159, in relation to the rate of spring 142, is such that for each position of said cam, corresponding to a position of manual control lever 38 at any particular graduation on scale 39, the action of the main speed governor will cause the engine to operate at the speed (r.p.m.) called for by the reading on scale 39.

It is also to be noted that if the manual control lever 38 is suddenly advanced from a lower to a higher speed position on scale 39 to accelerate the engine (i.e., throttle burst), the sudden compression of spring 142 by cam 159 will at once overcome the force of centrifugal weights 141 and depress the valve 148 to a low position, substantially opening the end of conduit 149. This has the immediate effect of cutting out the action of the main speed governor, whereupon fuel flows under high pressure ($p_f$) from conduit 150 into conduits 149 and 83, thus tending to raise the control pressure ($p_s$) in conduit 83 to the full value of ($p_f$). Such a sudden increase in control pressure ($p_s$), if unlimited, would tend to accelerate the engine at such a high rate as to bring about compressor stall and engine failure.

To avoid this difficulty, we have provided a manual metering head valve 204 which works in series with the main speed governor and limits the rate of fuel flow to the engine during acceleration, when the main speed governor is cut out. Valve 204 is connected by a conduit 205 to conduits 149 and 83 and is therefore subject to control pressure ($p_s$) in conduit 83, and to any increase in said pressure, whenever valve 148 is in its low position and fuel under high pressure ($p_f$) flows from conduit 150 into conduit 149. Valve 204 is biased towards its closed position by a spring 206 whose force is varied by a movable seat 207 which has an integral stem 208, screw threaded at its lower end into a stud 209 of a disk 210, and is secured therein by a lock nut 211. Disk 210 bears against a cam 212 which is adjustably mounted on manual control shaft 36. By this arrangement the force of spring 206 is varied from a minimum, when cam 212 is in its lowest position, corresponding to the idling engine speed setting of manual control lever 38 on scale 39 (Figure 1), to a maximum, when cam 212 is in its highest position, corresponding to maximum engine speed. At the same time, the tension in spring 206, for any particular position of cam 212, can be adjusted by the screw thread attachment of disc 210 to stem 208. A conduit 223 connects the chamber of valve 204 to conduit 191, so that fuel passing valve 204 escapes into discharge conduit 27 and thence to the engine. It is apparent from the arrangement just described that during acceleration, when the centrifugal governor is cut out, the amount of opening of valve 204 controls the flow of fuel from conduits 205 and 149 and hence the control pressure ($p_s$) in conduit 83.

When valve 148 is exactly in its middle (neutral) position, as shown in Figure 2, no fuel flows from conduit 150 into conduit 149 through valve 148; however, some fuel tends to flow from conduit 150 through restriction 162 and conduits 83, 149 and 205 to valve 204. Below maximum safe speed, the flow of fuel through conduit 197 is blocked by valve 199 in the topping speed governor; hence the control pressure ($p_s$) in conduit 83 depends (during acceleration) upon the force applied to valve 204 by spring 206. Under steady state operating conditions, when valve 148 is approximately in its neutral (closed) position, the force of spring 206 is just sufficient to keep valve 204 on its seat, thus precluding any fuel flow therethrough. Whenever valve 148 moves down from its neutral position and begins to open the end of conduit 149, the fuel flow therethrough supplements that through restriction 162, and the control pressure ($p_s$) in conduits 83, 149 and 205 will rise and valve 204 will open until the amount of fuel passing therethrough equals that through conduit 149 and restriction 162.

Whenever the manual control lever 38 is suddenly advanced (throttle burst), and the speed governor cut out by valve 148 moving to its low position, the force of spring 206 is just as suddenly increased by the simultaneous throw of cam 212 with cam 159 on the same shaft 36. But the rate of spring 206 is such that any increase in control pressure ($p_s$) in conduits 83, 149 and 205, over that required to accelerate the engine at its maximum permissible rate, is relieved by the opening of valve 204 and the escape of excess fuel from conduits 205, 149 and 83. By this means, the rate of acceleration of the engine is regulated so as to equal a maximum permissible rate of acceleration without exceeding such rate and thus cause compressor stall.

A problem, similar to that attending throttle burst just mentioned, also obtains (but in reverse) when the manual control lever 38 is suddenly retracted from a high to a low speed setting on scale 39 (Figure 1). Here the difficulty is that the rate of fuel flow to the engine may be reduced at such a rapid rate as to cause burner blowout and consequent engine failure. To deal with this problem, we have provided a deceleration fuel control for regulating the rate of decrease in fuel flow upon deceleration of the engine so as to secure maximum rate of deceleration, but said flow will always be sufficient to prevent burner blowout.

The deceleration fuel control comprises a valve 213, connected by a conduit 214 to conduit 151, and biased toward closed position by a spring 215 whose force is varied by a movable seat 216 having a stem 217 screw threaded into a boss 218 on a disc 219 and secured therein by a lock nut 220. Disk 219 bears against a cam 221 which is adjustably mounted on an extension of shaft 97 outside of chamber 98. A conduit 222 connects the chamber of valve 213 with conduit 223, so that any fuel passing valve 213 escapes through conduits 222, 223, 191, 131 and 27 to the engine.

When manual control lever 38 is quickly retracted to decelerate the engine speed, the rotation of cam 159 on the main speed governor suddenly reduces the compression of spring 142. This causes governor valve 148 to rise up under the superior force of weight arms 141 and establish communication between conduits 149 and 151. Fuel then escapes from conduit 149 through conduits 1451 and 214, valve 213, and conduits 222, 223, 191, 131 and 27 to the engine, thereby reducing the control pressure ($p_s$) in conduit 83 and therewith the fuel flow to the engine, as explained hereinabove. In order to avoid too rapid escape of fuel from conduit 149 upon a substantial rise of governor valve 148, cam 221 of the deceleration fuel control is arranged on main fuel metering valve actuator shaft 97 in quadrature with cam 95 of the main fuel metering valve so that, as shaft 97 is rotated in a throw-decreasing direction by the contraction of bellows 99, cam 221 is simultaneously rotated in a throw-increasing direction to increase the compression (and force) of spring 215. This increased force of spring 215 forces valve 213 towards its seat and retards the escape of fuel from conduits 149 and 83, thereby retarding the rate of decrease in fuel flow during deceleration of the engine. The rate of decrease in fuel flow, caused by the rotation of cam 221 in a throw-increasing direction, depends upon the contour of cam 221 and the rate of contraction of bellows 99, which in turn depends upon the rate of decrease in absolute compressor discharge pressure ($p_2$) resulting from the decreasing speed of the engine. It is thus apparent that the rate of decrease in fuel flow is coordinated with the rate of decrease in engine speed, so that the total fuel flow to the engine during deceleration will always be sufficient to prevent burner blowout and engine failure.

In lieu of the main speed governor anticipator mechanism, described above, which tends to make the said governor substantially isochronous, we have provided an alternative arrangement, as shown in Figure 3, wherein the main speed governor operates with a slight droop. As shown in Figure 3, the anticipator mechanism is omitted, and there is substituted therefor a fixed, calibrated restriction 310 between conduits 149 and 151. Also, in the arrangement illustrated in Figure 3, the main speed governor is adjusted so that when the upward thrust of centrifugal weight arms 141 is in balance with the downward thrust of spring 142, governor valve 148 is always slightly below its neutral (closed) position, as shown in Figure 3. Hence, during steady state operation, the fuel flow from conduit 149 to conduit 151 is entirely through restriction 310. Within the normal range of engine operation, the upper end of conduit 151 is closed by a valve 247, described below (see Figure 2); hence any fuel passing from conduit 149 to 151 must escape through valve 213, and the force of spring 215 is adjusted to permit this flow.

At the same time, fuel under pressure ($p_f$) entering conduit 150 flows partly through fixed restriction 162 and conduit 83, and partly past valve 148, to conduit 149, and thence through conduit 205 and valve 204 to conduit 223. In passing from conduit 150, through restriction 162 and valve 148, to conduit 149, the fuel pressure ($p_f$) drops to control pressure ($p_s$), which actuates valve 80 to regulate the pressure ($p_{f'}$) on the main fuel metering valve 89. (See Figure 2.) In passing from conduit 149, through valve 204, to conduit 223, the fuel pressure drops from control pressure ($p_s$) to metered fuel pressure ($p_m$), while in passing from conduit 149 to conduit 151, through restriction 310, to conduit 151, the fuel pressure drops from control pressure ($p_s$) to a pressure ($p_{m'}$), which is equal to the metered fuel pressure ($p_m$) in conduit 222, minus the rate of spring 215 which is a constant. So long as the quantity of fuel flowing from conduit 150 past restriction 162 and valve 148 to conduit 149, does not exceed the quantity of fuel flowing from conduit 149 through restriction 310 to conduit 151, valve 204 is in closed position, and the control pressure ($p_s$) is determined by the pressure drop ($p_1-p_s$) across restriction 162 and valve 148.

If now, governor valve 148 moves further down and increases the opening of conduit 149, the increased fuel flow into conduit 149 exceeds the former fuel flow through restriction 310, whereupon the control pressure ($p_s$) in conduits 149 and 83 rises to a higher value which causes valve 204 to open and the excess fuel escapes therethrough. (See Figure 2.)

When the manual control lever 38 is advanced to accelerate the engine and governor valve 148 moves down and opens communication between conduits 149 and 150, the resulting increase in pressure in conduit 149 is substantially the same as in the arrangement shown in Figure 2, since the small size of restriction 310 prevents any appreciable decrease in transient pressure in conduit 149. Similarly, when manual control lever 38 is retracted to decelerate the engine and governor valve 148 rises and opens communication between conduits 149 and 151, the resulting decrease in pressure in conduit 149 is also substantially the same as in the arrangement shown in Figure 2.

From the foregoing, it is clear that the principal effect of restriction 310 is to permit a limited leakage around governor valve 148, which tends to stabilize the action of the main speed governor by making it less responsive to small fluctuations in engine speed, since small variations in the opening of valve 148 are a smaller percentage of the combined opening through valve 148 and restriction 310, than of the opening through valve 148 alone.

The operation of turbo-jet engines in cold weather, where low (i.e. below zero degrees, centigrade) ambient air temperatures are encountered, has clearly shown the desirability of modifying the fuel flow to the engine in accordance with compressor inlet air temperature ($T_1$), i.e., ambient atmospheric temperature, in order to counteract the tendency to excess fuel at low ambient atmospheric temperatures that may cause compressor stall. For this purpose, we have provided a thermal control which modifies the action of the pilot's manual control described hereinabove, so as to vary the fuel metering head across the main fuel metering valve 86 in accordance with engine (and compressor) air inlet temperature ($T_1$), whereby, as said temperature falls, the fuel metering head is correspondingly reduced, and vice versa.

The air inlet thermal control comprises the following elements. A temperature sensitive device 224, located in the engine air inlet 2 (Figure 1), is filled with a fluid that expands and contracts in proportion to its temperature, and transmits fluid pressure, proportional to the temperature of the air entering inlet 2 and compressor 3, through conduit 33 to a pressure responsive bellows 225 (Figure 2) which is attached to the casing 41. The movable upper end of bellows 225 has secured thereto a stem 226 having at its upper end a disk 227 which serves as a seat for a spring 228 that biases a ball valve 229 towards its closed position. Valve 229 is located in a chamber 230 which is connected by a conduit 231 to conduit 205 and by another conduit 232 to the chamber containing manual metering head valve 204, so that valves 204 and 229 work in parallel to modify the metering head on main fuel metering valve 86. Upon a fall in temperature of the air entering air inlet 2, the decreased fluid pressure in bulb 224 causes a contraction of bellows 225 which lowers disk 227 and decreases the force of spring 228 upon valve 229, and vice versa. Whenever the force of spring 228 is less than the control pressure ($p_s$) acting downwardly on valve 229, said valve opens and permits more fuel to escape from conduit 83 through conduits 149, 231, 232, 223, 191, 131 and 27 to the engine, thus reducing control pressure ($p_s$) in conduit 83 and consequently reducing the fuel flow to the engine, as explained hereinabove, and vice versa. It is thus apparent that the fuel flow to the engine is compensated for variations in temperature of the air entering air inlet 2 and compressor 3, thereby counteracting the tendency to excess fuel flow at low ambient atmospheric temperatures and preventing possible compressor stall from this cause.

Owing to metallurgical limitations, turbo-jet engines cannot be safely operated at speeds which cause the temperature of the exhaust gases in the tail pipe of the engine to exceed a predetermined safe value. To meet this condition, we have provided a thermal override control which overrides the manual control described hereinabove, as a function of the temperature ($T_4$) of the exhaust gases in the tail pipe 15 of the engine, and reduces the fuel flow to the engine, whenever the temperature ($T_4$) exceeds its predetermined safe value, until said temperature falls below said value, whereupon the thermal override control again becomes inoperative.

The temperature override control comprises the following elements. A temperature detecting thermocouple 233, encased in a suitable protective sheath, is located in the tail pipe 15 (Figure 1), so as to be exposed to the current of exhaust gases passing through said tail pipe. The output of thermocouple 233 is transmitted by wires 234 and 235 to an amplifier 236 from which the amplified current flows over wires 237 and 238 to a proportional solenoid 239 in casing 41 (Figure 2). Solenoid 239 has a fixed metallic core whose magnetic force varies in proportion to the intensity of the current flowing through said solenoid. The magnetic attractive force of core 240 is exerted upon an armature on the right end of a lever 241 which is pivoted at 242 to casing 41 and whose bifurcated left end engages a pin 243 on a spool valve 244 slidably mounted in a bore 245 in casing 41. Spool valve 244 has an undercut middle portion defining an annular recess 246 and an upper land portion 247 which blocks and cuts off the entrance of conduit 151 when said valve is in its normal inoperative position, as shown in Figure 2. The top of spool valve 244 terminates in a disk 248 which serves as a seat for a spring 249 whose upper end is seated in a recess in casing 41.

As long as the tail pipe temperature ($T_4$) is appreciably below its safe limiting value, the force of spring 249 is greater than the magnetic pull of solenoid core 240 on lever 241 and spool valve 244 is held in its normal inoperative position, as shown in Figure 2. However, when temperature ($T_4$) rises to a point which approaches its safe limiting value, the increased current flowing through solenoid 239 causes the magnetic pull of core 240 on lever 241 to gradually compress spring 249, whereupon valve 244 rises and uncovers the entrance of conduit 151, thus establishing communication between conduits 151, 149 and 205. When this occurs, fuel escapes from conduit 83 through conduits 149, 151 and 205 to the engine, as hereinabove indicated. The escape of fuel from conduit 83 lowers the control pressure ($p_s$) with resulting decrease in fuel flow to the engine, as previously explained. With reduced fuel flow the speed of the engine decreases and this continues with resulting decrease in temperature ($T_4$), until said temperature falls below its safe limiting value, whereupon the force of spring 249 again exceeds the magnetic pull of solenoid core 240 on lever 241 and spool valve 244 is again returned to its normal inoperative position.

Since solenoid 239 is of the proportional type, its action on lever 241 and spool valve 244 is gradual as the temperature ($T_4$) begins to approach its safe limiting value. Hence, the opening of conduit 151 is gradual and proportional to the rise in temperature ($T_4$) until said temperature reaches its safe limiting value, at which point valve 244 reaches the upper limit of its travel and the maximum fuel flow from conduit 83 through conduits 149 and 151 occurs. Similarly, with falling temperature ($T_4$) the action of solenoid 239 on spool valve 244 is equally gradual until said valve reaches its fully closed position.

It is apparent from the foregoing that as long as temperature ($T_4$) is materially below its safe limiting value, the thermal override control has no effect on the flow of fuel to the engine. It is also apparent that in case of a failure of the thermocouple 233, or other elements of the thermal override control, said control will become inoperative (i.e., fail-safe).

The operation of aircraft turbo-jet engines at high altitudes, where the ambient atmosphere is much lighter (less dense) than at lower levels, has shown the necessity for increasing the idling speed of the engine with increasing altitude, in order to avoid engine cut out. To deal with this problem, we have provided an altitude control which modifies the pilot's manual control, so as to furnish an increasing schedule of idle engine speed with increasing altitude and thus maintain engine operation under such conditions of flight.

The altitude control 250 comprises the following elements. A sealed bellows 251, evacuated to zero pressure ($p_0$), is located in a closed chamber 252 in casing 41 which communicates through a conduit 253 with the outside atmosphere. A calibrated spring 254 in bellows 251 acts in opposition to the atmospheric pressure in chamber 252 and biases bellows 251 in an upward direction. Attached to the movable top of bellows 251 is a disk 255 which is connected by a stem 256 and crank arm 257 to a shaft 258 that extends through the wall of chamber 252 into the casing 41. A second crank arm 259 attached to the other end of shaft 258 bears against the lower end of a servo valve 260 having two land portions 261 and 262 and an interposed cut-away portion which defines a recess 263. The top of servo valve 260 terminates in a disk 264 which serves as a seat for a spring 265 bearing against another disk 266 that is connected by a stem 267 and lever arm 268 adjustably attached to a shaft 269 journalled in casing 41. Shaft 258 passes through a groove in the wall of chamber 252 which is connected to overboard drain conduit 117, so that any air leaking from chamber 252 along shaft 258 escapes to the outside atmosphere.

The bore in casing 41 in which servo valve 260 is slidably mounted is connected by conduits 114, 115, 82 and 32 to the inlet side of fuel pump 22. While said bore is also connected by conduits 271, 272, 273 and 131 to fuel discharge conduit 27, no fuel flows through conduits 271, 272 and 273 during operation of the normal fuel regulating system, since the same pressure ($p_m$) obtains at both ends of this loop. A conduit 274 connects the recess 263 in servo valve 260 with a chamber 275 in casing 41. A hollow piston 276 is slidably mounted in chamber 275 and is connected by a stem 277 to a lever arm 278 which is adjustably attached to shaft 269. A spring 279 biases piston 276 in a downward direction in opposition to the fuel pressure in chamber 275.

A conduit 280 connects conduit 271 through a filter 281 with conduit 45 and supplies fuel under pump discharge pressure ($p_f$) to servo valve 262 from conduit 130 and manual control valve 121, when the fuel regulating apparatus is operating through its normal fuel control system. Adjustably attached to shaft 269, which is axially aligned with shaft 36, are two cams 270 and 289 which are positioned in quadrature with cams 159 and 212, respectively, so that, as cams 159 and 212 are rotated in a throw-decreasing direction, by retarding manual control lever 38 toward idling position, and cams 270 and 289 are rotated in a throw-increasing direction by the altitude control mechanism, cam 270 comes into contact with disk 158, relieving cam 159 from contact therewith, and thus takes over the control of spool valve 140, while cam 289 comes into contact with disk 210, relieving cam 212 from contact therewith, and thus takes over the control of valve 204.

With the elements of the altitude control as just described, it will be seen that, as the aircraft climbs to higher altitudes, the air pressure in chamber 252 decreases, whereupon bellows 251 expands from its own resiliency and the force of spring 254, and raises servo valve 260 against the force of spring 265, thus establishing communication between conduits 271 and 274. Fuel under metered pressure ($p_m$) then enters chamber 275 raising piston 276 against the force of spring 279 and rotating shaft 269 in a counterclockwise direction. This rotates cams 270 and 289 in a throw-increasing direction which causes said cams to contact disks 158 and 210, respectively, when the rotation of cams 159 and 212 in a throw-decreasing direction, by the retardation of manual control lever 38 towards idle position, causes the throws of cams 159 and 212 to be less than the throws of cams 270 and 289, respectively. The contacts of cams 270 and 289 with disks 158 and 210, respectively, cause the altitude control to take over the operation of spool valve 140 and valve 204 from the manual control lever 38. Since valves 140 and 204 regulate the metering head on main fuel metering valve 86, it is clear that the fuel flow to the engine is determined by the altitude control which is adjusted to provide a predetermined increasing schedule of idle fuel flow with increasing altitude, as required to maintain an engine operation under conditions of high altitude flight. Conversely, when the aircraft begins to descend to lower altitudes, the reverse action of the altitude control insures that idle fuel flow to the engine is decreased with decreasing altitude, until the advancement of manual control lever 38 to normal operating range causes the increased throw of cams 159 and 212 to exceed the decreasing throw of cams 270 and 289, respectively, whereupon the manual control takes over the regulation of fuel flow to the engine from the altitude control.

It will be noted from the arrangement of the altitude control mechanism 250 that when the fuel regulating apparatus is operating through its normal fuel control system; and servo valve 260 is in its upper position, fuel under metered pressure ($p_m$) enters chamber 275 and acts on piston 276; when servo valve 260 is in its lower position, fuel escapes from chamber 275 back to the inlet side of fuel pump 22 which reduces the pressure in chamber 275 acting on piston 276 to fuel pump inlet pressure ($p_i$); and when servo valve 260 is in its middle (neutral) position, as shown in Figure 2, the pressure in chamber 275 is static at a value between ($p_m$) and ($p_i$), depending upon the pressure existing in chamber 275 at the instant that servo valve 262 closes conduits 271 and 114. It will also be noted that, when servo valve 260 is raised above its neutral position by the expansion of bellows 251, the resultant rise of piston 276, acting through lever arms 278 and 268, compresses spring 265, which in turn increases the downward thrust on servo valve 260 and returns said valve to its neutral position, whereupon the pressure in chamber 275 becomes static at whatever value it had when servo valve 262 closed conduit 271. Conversely, when the contraction of bellows 251 lowers servo valve 260 below its neutral position, the resultant descent of piston 276 reduces the compression of spring 265 which in turn permits servo valve 260 to rise and return to its neutral position. The overall effect of the follow-up of piston 276 is to stabilize the action of the altitude control mechanism upon each change of atmospheric pressure and thus maintain a steady idle fuel flow corresponding to each value of atmospheric pressure.

When an aircraft turbo-jet engine is accelerated, particularly when taking off from the ground, it has been found that additional power can be obtained from the engine by injecting water, or other coolant liquids, into the intake of the compressor where it evaporates and prevents overheating of the compressor during engine acceleration. This permits a higher rate of fuel supply to the engine with resulting increase in power output. To provide for the additional fuel flow that is permissible during acceleration when water injection is used, we have included in our normal fuel control system a water injection control which increases the metering head across the main fuel metering valve, with corresponding increase in fuel flow to the engine, when the water injection control device is cut into the normal fuel control system by the pilot.

The water injection control comprises the following elements. A check valve 290 is interposed in the conduit 223 between valve 204 and fuel discharge outlet 131 and 27. Valve 290 is biased towards closed position by a spring 291 acting in opposition to the metered fuel pressure ($p_m$) in conduit 223. A by-pass conduit 292, controlled by a solenoid-actuated valve 293, permits unrestricted fuel flow around valve 290 when solenoid valve 293 is in its normal open position, but when valve 293 is closed, the fuel flow through conduit 223 must pass through valve 290 against the force of spring 291 which raises the pressure in conduit 223 upstream of valve 290 and thus increases the force acting on valve 204 to bias it towards its closed position. This increase of back pressure on valve 204 causes an increase in the metering head across the main fuel metering valve 86 with corresponding increase in fuel flow to the engine. Solenoid valve 293 is operated by a switch (not shown) under the pilot's manual control, so that when he desires to use water injection, he closes said switch, which in turn closes solenoid valve 293, and vice versa. As the means by which water is injected into the compressor comprises a system, separate and distinct from the fuel supply system of the engine, and forms no part of our invention, such means is not disclosed in this application.

Emergency fuel regulating system

The emergency fuel regulating system of the control apparatus comprises five coordinated control units as follows:

(1) A by-pass relief valve for regulating the pressure ($p_t$) of the fuel in conduit 25 on the downstream side of fuel pump 22.

(2) A fuel metering valve, operated manually by control lever 28, whereby the pilot, by suitably adjusting the position of said lever, can obtain any particular engine speed he desires throughout the permissible operating range of the engine.

(3) The boost pressure compensating valve of the Normal Fuel Regulating System described above.

(4) The topping speed governor of the Normal Fuel Regulating System described above.

(5) The altitude control of the Normal Fuel Regulating System described above.

Upon entering the emergency fuel regulating system through conduit 45, excess fuel flows through a by-pass relief valve 300 which comprises a cylinder 301 containing a hollow piston 302, biased toward the upper end of said cylinder by a spring 303, so as to vary the opening of outlet conduit 58 by which fuel in excess of engine requirements is returned through conduit 32 to the inlet side of fuel pump 22. The lower end of cylinder 301 is connected through conduit 195 to other units of the emergency fuel regulating system by means of which fuel under a control pressure ($p_{s'}$) acts on the lower side of piston 302 in opposition to the fuel pump discharge pressure ($p_t$) in conduit 45 acting on the upper side of said piston. The force of spring 303 balances the pressure differential ($p_t$—$p_{s'}$) and the spring rate is such that piston 302 maintains a predetermined value of the fuel pump discharge pressure ($p_t$) for each value of the control pressure ($p_{s'}$) by varying the flow of fuel through return conduits 58 and 32.

Fuel entering the normal fuel regulating system through conduit 45 also flows through conduit 130 to manual control valve 121 of which valve head 125 is specially contoured with reference to the outlet of conduit 130 to function as the main fuel metering valve of the emergency regulating system. Valve 125 is manually operated by control lever 38 through shaft 36, crank arm 129, and link 128, and is provided with a passageway 304 by which fuel passes from chamber 124 to chamber 123 and hydraulically balances valve 125. Since check valve 84 in the normal regulating system is closed when the emergency regulating system is in operation, fuel is blocked in conduit 120, main fuel metering valve 86 and conduit 85, so that no fuel flows through any of the units of the normal fuel regulating system, except boost pressure compensating valve 132 and topping governor 201, and altitude control 260, as hereinafter described. Hence, during operation of the emergency system, valve 125 constitutes the sole means of regulating and controlling the flow of fuel to the engine, except for the actions of boost pressure compensating valve 132, the topping governor 201, and altitude control 260, which still function in the same manner as when the normal fuel regulating system is in operation.

During operation of the emergency fuel regulating system, the boost pressure compensating valve functions in the same manner and for the same purpose as when the normal fuel regulating system is in operation, as described above.

When the emergency fuel regulating system is in operation, triple solenoid valve 59 is in its lower position, whereby communication is cut off between conduits 196 and 197, while communication is estalished between conduits 272 and 194. Hence, fuel flows from conduit 45 through conduits 280, 197, 271, 272 and 194 to the topping governor 201 when said governor is in operation. However, since the topping governor 201 is inoperative, except when the engine exceeds its maximum safe speed, and since communication between conduits 196 and 197 is closed, there is no fuel flow through conduits 194 and 195 during the operation of the emergency fuel regulating system below the maximum safe speed of the engine, and the variable static control pressure ($p_{s'}$) in conduit 195, acting on piston 302, is determined by the fuel flow through a restriction 282 in conduit 271, a valve 283, and conduits 273, 131 and 27. In passing through restriction 282 the fuel pressure drops from pump discharge pressure ($p_t$) to control pressure ($p_{s'}$), and in passing through valve 283, the fuel pressure drops from control pressure ($p_{s'}$) to metered fuel pressure ($p_m$). Accordingly, control pressure ($p_{s'}$) varies between pressure ($p_t$) and pressure ($p_m$), its value at any particular instant depending upon the relative opening through valve 283 as compared to the opening through restriction 282. Valve 283 is biased toward closed position by a spring 284, seated on a disk 285 connected by a stem 286 to a cam follower 287 which bears against a cam 288 that is adjustably mounted on shaft 269. The rotation of shaft 269 by expansion and contraction of bellows 251 causes cam 288 to vary the compression of spring 284 and thereby the opening of valve 283, in accordance with variations in atmospheric pressure, as explained above.

When the opening through valve 283 exceeds that through restriction 282, the pressure drop across said restriction is ($p_t$—$p_m$) and control pressure ($p_{s'}$) reaches its minimum value, equal to ($p_m$). As valve 283 moves toward its closed position, and the opening through valve 283 is less than that through restriction 282, the value of control pressure ($p_{s'}$) increases until valve 283 reaches its position of minimum opening, at which point the value of control pressure ($p_{s'}$) approaches pressure ($p_t$). But since valve 283 is so controlled that it never completely closes, the value of control pressure ($p_{s'}$) never quite equals pressure ($p_t$).

When the engine exceeds its maximum safe speed and topping governor valve 199 opens pasageway 190, fuel escapes through conduit 194, passageway 190, and conduits 191, 131 and 27 to the engine. This reduces the control pressure ($p_{s'}$), whereupon piston 302 descends and reduces the pressure ($p_t$) on metering valve 125 with corresponding decrease in fuel flow to the engine, until the resulting reduction in engine speed causes topping governor valve 199 to close passageway 190, whereupon the control pressure ($p_{s'}$) resumes its former value.

During operation of the emergency fuel regulating system, fuel flows from conduit 45 through conduits 280 and 271 to altitude control servo valve 260 under pump discharge pressure ($p_t$) and the altitude control functions, as described above, to regulate control pressure ($p_{s'}$) by varying the opening of valve 283, and thus regulates the fuel flow to the engine, so as to maintain an increasing schedule of idle fuel flow with increasing altitude in a manner similar to that in which it operates during normal fuel flow regulation.

Operation

Thus far, we have described the construction and functioning of the various units and elements of our fuel control apparatus under its three major sub-divisions, viz: (1) Change-Over Valve System; (2) Normal Fuel Regulating System; and (3) Emergency Fuel Regulating System. We will now describe the operation of our fuel control apparatus as a whole.

We will first assume that the apparatus is operating under normal operating conditions. Here switch 67 is in its "off" position (69), triple spool valve 59 is in its upper position, and change-over valve 51 is in its left position, all as shown in Figure 2. Fuel supplied by pump 22 through conduit 25 flows through valve 49, conduit 44, check valve 84, conduit 85, main metering valve 86, conduit 120, cut-off valve 126, conduit 131, boost pressure compensating valve 132, flow divider 28, conduits 29, 30, 9, 10, 11 and 12 and nozzles 6 to combustion chamber 5 of engine 1. Fuel in excess of engine requirements also flows through conduit 77, main bypass valve 78, and conduits 82, 32 and 24 back to the inlet side of fuel pump 22. The action of valve 78 regulates the fuel pump discharge pressure ($p_f$) in conduits 77 and 44 and the main metering valve inlet pressure ($p_{f'}$) in conduit 85.

From conduit 77 fuel flows under pressure ($p_f$) through conduit 150 to spool valve 140 of the main speed governor, and through conduit 161, restriction 162, conduits 83, 149, 205, manual metering head valve 204, conduits 223, 191, 131, boost pressure compensating valve 132 and conduit 27 to the engine. At the same time, a portion of the fuel flowing through conduit 205 flows through conduit 231, air inlet thermal control valve 229, and conduit 232 to join the fuel flowing through valve 204. In passing through restriction 162, the fuel pressure drops from pump discharge pressure ($p_f$) to control pressure ($p_s$) in conduits 83, 149, 205 and 231, and in passing through valves 204 and 299, the fuel pressure drops from control pressure ($p_s$) to metered fuel pressure ($p_m$) in conduits 223 and 232. Under steady state operation, with the engine running at constant speed, the opposing forces of centrifugal weight arms 141 and spring 142 are in balance and spool valve 140 is in its neutral (closed) position, as shown in Figure 2. The control pressure ($p_s$) in conduits 83, 149, 205 and 231 is then determined by the relative openings of valve 204 and 229 as compared to the opening through fixed restriction 162. If valves 204 and 229 were wide open, control pressure ($p_s$) would drop to the value of metered pressure ($p_m$) in conduits 223 and 232, and if valves 204 and 229 were fully closed, control pressure ($p_s$) would rise to the value ($p_f$) in conduit 150, assuming thermal override valve 247 were in its normal closed position. However, valves 204 and 229 are so controlled by their associated mechanisms that they are never either fully open nor completely closed. Hence, the control pressure ($p_s$) always remains at an intermediate value between pressures ($p_f$) and ($p_m$).

Assuming no change in the position of manual control lever 38, extraneous fluctuations in engine speed are corrected by slight movements of spool valve 140 of the main speed governor from its neutral closed position, as described above, and the action of the main speed governor is stablized and made more sensitive to changes in engine speed by the action of the anticipator mechanansim 165—188, as described above. Under these conditions, it is clear that the control pressure ($p_s$), which determines the inlet pressure ($p_{f'}$) on main metering valve 86 is governed principally by the action of spool valve 140 of the main speed governor, the effects of valves 204 and 229 being secondary, except when there are radical changes in atmospheric temperature which cause corresponding changes in the operation of valve 229, as described above. The control pressure ($p_s$) is, of course, also subject to sudden and radical reductions in value if either, or both, the topping speed governor 201 or tail pipe thermal override control 247, come into action, by reason of engine speed or tail pipe temperature exceeding their safe limiting values, as described above.

Since the position of spool valve 140 is determined by the balance between the forces of spring 142 and centrifugal weight arms 141, it is clear that, for each position of manual control lever 38 on scale 39, cam 159 will compress spring 142 by a predetermined amount, depending upon the contour of said cam, and this causes a definite schedule of downward thrusts upon spool valve 140 which are met by an equal schedule of upward thrusts from weight arms 141. Accordingly, for each position of manual control lever 38, the engine will respond with a definite speed which is indicated on scale 39.

When spool valve 140 is temporarily cut out by the sudden advancement of manual control lever 38, the rate of acceleration of the engine is determined by the action of valve 204 under the influence of spring 206 whose force is regulated by the contour of cam 212 which is simultaneously rotated with cam 159 by shaft 36. By this means, the rate of fuel flow to the engine during acceleration is controlled so as to obtain a maximum rate of acceleration and, at the same time, insure against too high a rate of fuel feed with resulting compressor stall. And when spool valve 140 is also temporarily cut out by the sudden retardation of manual control lever 38, the rate of deceleration of the engine is determined by the action of valve 213 under the influence of spring 215 whose force is regulated by the contour of cam 221 which is simultaneously rotated by the expansion of bellows 99 with the decreasing value of compressor discharge pressure ($p_2$) that results from decreasing engine (and compressor) speed. By this means, the rate of fuel flow to the engine during deceleration is controlled so as to obtain a maximum rate of deceleration and, at the same time, insure against too low a rate of fuel feed with resulting burner blowout.

The overriding actions of valve 199 of the topping governor, and valve 247 of the tail pipe thermal ($T_4$) control, to provide against excessive engine speed and temperature, respectively, have been described above; the modifying actions of valve 229 of the air inlet thermal ($T_1$) control, and cams 270 and 289 of the altitude control, in order to provide compensation for variations in ambient atmospheric temperature, and an increasing schedule of idle engine speeds with increasing altitude, have been described; and the supplementary actions of valve 134 of the boost pressure compensating control, and valve 290 of the water injection control, have been described above. Accordingly, the operation of these auxiliary controls need not be further elaborated here, beyond observing that they all operate on the pressure head across the main fuel metering valve.

On the other hand, the action of bellows 99 on the main fuel metering valve is to vary the opening through said valve with variations in compressor discharge pressure ($p_2$), in order to maintain a predetermined ratio between the rate of fuel flow and the rate of air flow to the engine throughout the normal operating range of the engine. Since the compressor discharge pressure ($p_2$) is a measure of the velocity of air flow through the engine and varies with atmospheric density, and the action of the air inlet temperature ($T_1$) control compensates the fuel flow for variations in air temperature, it is clear that the combined action of these two controls is to insure a desired fuel/air mixture ratio under all operating conditions.

Passing now to a consideration of the operation of the emergency fuel regulating system, it should be first observed that the purpose of this system is to provide an alternate means for supplying fuel to the engine in case of failure of the normal fuel regulating system, despite the incorporation of several fail-safe arrangements therein. Since the emergency fuel regulating system is used only in the event of failure of the normal fuel regulating system, the former operates only during relatively short emergency periods until the latter can be brought back into operation. Hence, most of the auxiliary controls of the normal fuel regulating system are unnecessary and are omitted in the interest of simplicity.

When the aircraft is taking off from the ground, any failure of the normal fuel regulating system would be most critical, particularly as the pilot then has the minimum time in which to manually operate any control devices. Therefore, during take-off, the pilot sets switch 67 in its intermediate (take-off) position 71, so that if the normal fuel regulating system fails, the immediately resulting decrease in fuel pressure in conduit 120 of the normal fuel regulating system permits spring 73 to automatically close switch 72, which lowers solenoid valve 59 and causes change-over valve 51 to shift from its left (normal) position to its right (emergency) position, and thereby cut out the normal and cut in the emergency fuel regulating system. If take-off is normally accomplished, the pilot changes switch 67 to its lower (off) position 69 where it remains unless a failure of the normal fuel regulating system should occur in flight after take-off, whereupon the pilot at once shifts switch 67 to its upper (emergency) position which also lowers solenoid valve 59 and causes change-over valve 51 to cut out the normal and cut in the emergency fuel regulating system.

During operation of the emergency fuel regulating system, fuel supplied by pump 22 through conduit 25 flows through valve 50, conduits 45 and 130, manual metering valve 125, cut-off valve 126, conduit 131, valve 132, flow divider 28, conduits 29, 30, 9, 10, 11 and 12 and nozzles 6 to combustion chamber 5 of engine 1. Fuel in excess of engine requirements also flows through conduit 45, by-pass valve 300, and conduits 58, 32 and 24 back to the inlet side of fuel pump 22. The action of by-pass valve 300, under the influence of control pressure ($p_{s'}$) in conduit 195, regulates the fuel pump discharge pressure ($p_f$) in conduits 45 and 130. Since check valve 84 blocks the flow of fuel back through conduit 120, main metering valve 86, and conduit 85, and valve 49 cuts off fuel flow through conduit 44, no fuel can enter any part of the normal fuel regulating system, except the topping speed governor and the altitude control, as described below.

From conduit 45, fuel flows under pressure ($p_f$) through conduit 280, filter 281 and conduit 271 to servo valve 260 of the altitude control which operates as previously described, in connection with the normal fuel regulating system. A portion of fuel flowing through conduit 271 passes through restriction 282, valve 283, and conduits 273, 131 and 27 to the engine. Since communication is established by valve 59 between conduits 272 and 194, and valve 199 of the topping governor blocks passageway 190 (except when the engine exceeds its maximum safe speed), the flow of fuel through restriction 282 and valve 283 regulates the control pressure ($p_{s'}$) in conduit 195, as described above.

When the engine exceeds its maximum safe speed, topping governor valve 199 opens passageway 190 and reduces control pressure ($p_{s'}$) in conduit 83, with resulting decrease in engine speed, as described above.

During operation of the emergency fuel regulating system, the fuel is metered solely by valve 125, which is adjusted by moving manual control lever 38 to a position which gives the desired engine speed as indicated by a tachometer. Boost pressure compensation valve 132 functions the same as in the normal fuel regulating system.

Having now shown and described the preferred embodiment of our invention, we desire it to be understood that we do not limit ourselves to the details of construction disclosed by way of illustration, as these may be changed and modified by those skilled in the art without departing from the spirit of our invention or exceeding the scope of the appended claims.

What we claim is:

1. A fuel control apparatus, for an aircraft turbo-jet engine having a pump for supplying fuel thereto; comprising, in one unitary casing: a normal fuel regulating system having means for controlling the delivery of fuel from said pump to said engine under normal operating conditions, an emergency fuel regulating system having means, cooperating with said first means, for alternatively controlling the delivery of fuel from said pump to said engine under emergency operating conditions, and manually controlled, fuel pressure actuated means for changing the operation of said apparatus from said normal to said emergency system, and vice versa; said normal and emergency systems being connected in parallel between said pump and said engine, and having a flow regulating valve in a common fuel outlet connection from said systems to said engine; said valve being adapted to compensate the fuel flow therethrough for variations in fuel pressure at the inlet of said pump.

2. A fuel and speed control apparatus, for a turbo-jet engine having an air compressor and a pump for supplying fuel to said engine; comprising, in one unitary casing: a normal fuel regulating system having means for controlling the delivery of fuel from said pump to said engine under normal operating conditions, and an emergency fuel regulating system having means, cooperating with said first means, for alternatively controlling the delivery of fuel from said pump to said engine under emergency operating conditions, and a manually controlled device for changing the operation of said apparatus from said normal to said emergency system, and vice versa; said normal and emergency regulating systems having a common means effective to modify the idle fuel flow to said engine in accordance with the density of air entering said compressor.

3. A fuel and speed control apparatus, for an aircraft turbojet engine having a combustion chamber with a plurality of fuel burners therein, and a pump for supplying fuel to said burners, comprising: first means, responsive to engine temperature and acceleration which operate to regulate said fuel supply from said pump to said burners so as to insure maximum rates of engine acceleration, without exceeding a selected maximum permissible temperature in said engine, and second means, responsive to engine deceleration and cooperating with said first means, to regulate said fuel supply so as to maintain the minimum fuel flow required to preclude burner blow-out, under maximum engine deceleration conditions.

4. A control apparatus as in claim 3, having adjustments for said first means to permit selection of the maximum fuel flow for engine acceleration.

5. A control apparatus as in claim 3, including a governor responsive to the speed of the engine, for regulating the fuel flow to the engine in accordance with engine speed under normal fuel control operating conditions, and means for adjusting said governor for both idle and maximum engine speeds.

6. A fuel and speed control apparatus for a turbo-jet engine having an air compressor, a tail pipe, and a pump for supplying fuel to said engine; comprising a manual control lever and a fuel regulating system for controlling the delivery of fuel from said pump to said engine; said system comprising a fuel metering orifice, means, responsive to the discharge pressure of said compressor, for varying the flow area of said orifice in accordance with said pressure; means, responsive to said manual control lever for varying the metering head across said orifice in accordance with the position of said lever; and means, responsive to engine speed, for varying said metering head, during steady state engine operation, in accordance with said speed.

7. A control apparatus according to claim 6, including means, responsive to the temperature of the exhaust gases in said tail pipe, for varying said metering head in accordance with said temperature.

8. A control apparatus according to claim 6, wherein said speed responsive means include an all-speed governor driven by said engine, and means for modulating the action of said governor in response to changes in engine speed by anticipating said action.

9. A control apparatus according to claim 6, wherein said speed responsive means include a hydraulic means for stabilizing the action of said governor in response to changes in engine speed.

10. A fuel and speed control apparatus for a turbojet engine having an air compressor, a tail pipe, and a pump for supplying fuel to said engine; comprising a manual control lever and a fuel regulating system for controlling the delivery of fuel from said pump to said engine; said system comprising a fuel metering orifice, means, responsive to the discharge pressure of said compressor, for varying the flow area of said orifice in accordance with said pressure, means, responsive to said manual control lever for varying the metering head across said orifice in accordance with the position of said lever; and means, responsive to engine deceleration, for varying said metering head, during said deceleration, in accordance with engine speed.

11. A control apparatus according to claim 10, including means responsive to the discharge pressure of said compressor, for varying said metering head, during deceleration of said engine, in accordance with said pressure.

12. A fuel and speed control apparatus for a turbojet engine having an air compressor, a tail pipe, and a pump for supplying fuel to said engine; comprising a manual control lever and a fuel regulating system for controlling the delivery of fuel from said pump to said engine; said system comprising a fuel metering orifice, means, responsive to the discharge pressure of said compressor, for varying the flow area of said orifice in accordance with said pressure, means, responsive to said manual control lever for varying the metering head across said orifice in accordance with the position of said lever; means, responsive to the temperature of the air entering said compressor, for varying said metering head, during engine acceleration, in accordance with said temperature; and means, responsive to the temperature of the exhaust gases in said tail pipe for varying said metering head in accordance with said gas temperature.

13. A fuel and speed control apparatus, for a turbojet engine having a pump for supplying fuel to said engine; comprising, in one unitary casing: a normal fuel regulating system having means for controlling the delivery of fuel from said pump to said engine under normal operating conditions, and an emergency fuel regulating system having means, cooperating with said first means, for alternatively controlling the delivery of fuel from said pump to said engine under emergency operating conditions, and a manually controlled, fuel pressure actuated device for changing the operation of said apparatus from said normal to said emergency system, and vice versa; said emergency regulating system having manually operated means, comprising a fuel metering valve actuated by a manual control lever, for varying the flow of fuel to the engine during emergency fuel control operation; said last means including a fuel cut-off valve, attached to said metering valve, and so arranged as to cut off all fuel flow to the engine, through either said normal or said emergency system, when said lever is placed in cut-off position.

References Cited in the file of this patent

UNITED STATES PATENTS

| | | |
|---|---|---|
| 456,981 | Courtright | Aug. 4, 1891 |
| 2,136,959 | Winfield | Nov. 15, 1938 |
| 2,410,774 | Chandler | Nov. 5, 1946 |
| 2,422,808 | Stokes | June 24, 1947 |
| 2,435,902 | Reggio | Feb. 10, 1948 |
| 2,438,998 | Halford | Apr. 6, 1948 |
| 2,440,371 | Holley | Apr. 27, 1948 |
| 2,440,567 | Armstrong et al. | Apr. 27, 1948 |
| 2,479,813 | Chamberlin et al. | Aug. 23, 1949 |
| 2,498,939 | Bobier | Feb. 28, 1950 |
| 2,520,967 | Schmitt | Sept. 5, 1950 |
| 2,538,606 | Udale | Jan. 16, 1951 |
| 2,569,497 | Schiesel | Oct. 2, 1951 |
| 2,573,724 | Neal | Nov. 6, 1951 |
| 2,576,352 | Neal | Nov. 27, 1951 |
| 2,614,617 | Bobier | Oct. 21, 1952 |
| 2,628,472 | Dray et al. | Feb. 17, 1953 |
| 2,662,372 | Offner | Dec. 15, 1953 |
| 2,673,556 | Reggio | Mar. 30, 1954 |
| 2,700,872 | Lee | Feb. 1, 1955 |
| 2,702,560 | Bobier | Feb. 22, 1955 |

FOREIGN PATENTS

| | | |
|---|---|---|
| 603,884 | Great Britain | June 24, 1948 |